United States Patent
Nellen et al.

(10) Patent No.: US 8,840,174 B2
(45) Date of Patent: Sep. 23, 2014

(54) OPEN ROOF CONSTRUCTION FOR A VEHICLE

(75) Inventors: Marcel Johan Christiaan Nellen, Merselo (NL); Eduardus Christianus Henricus Van Boxtel, Zeeland (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 13/070,244

(22) Filed: Mar. 23, 2011

(65) Prior Publication Data

US 2011/0233971 A1    Sep. 29, 2011

(30) Foreign Application Priority Data

Mar. 23, 2010  (EP) ..................................... 10157317

(51) Int. Cl.
*B60J 7/04* (2006.01)
*B60J 7/02* (2006.01)

(52) U.S. Cl.
CPC .......................................... *B60J 7/02* (2013.01)
USPC ..................................................... 296/216.08

(58) Field of Classification Search
USPC .................................. 296/216.06–216.8, 223
See application file for complete search history.

(56) References Cited

U.S. PATENT DOCUMENTS

| 3,066,975 A |   | 12/1962 | Larche |         |
|-------------|---|---------|--------|---------|
| 4,475,767 A | * | 10/1984 | Grimm et al. | 296/221 |
| 4,601,091 A |   | 7/1986  | Grimm et al. |         |
| 4,650,243 A | * | 3/1987  | Hanley et al. | 296/221 |
| 4,946,225 A | * | 8/1990  | Jardin | 296/213 |
| 5,026,113 A | * | 6/1991  | DiCarlo et al. | 296/221 |

FOREIGN PATENT DOCUMENTS

| DE | 3510759   |   | 9/1986 |
|----|-----------|---|--------|
| DE | 20023526  |   | 8/2004 |
| FR | 2516870   |   | 5/1983 |
| FR | 2555948   |   | 6/1985 |
| GB | 2165193   |   | 4/1986 |
| JP | 58-68424  | * | 5/1983 |
| JP | 58068424  |   | 5/1983 |

OTHER PUBLICATIONS

European Search Report of the European Patent Office Patent Office in counterpart foreign application No. 10157317.8 filed Mar. 23, 2010.

* cited by examiner

*Primary Examiner* — Dennis H Pedder
(74) *Attorney, Agent, or Firm* — Steven M. Koehler; Westman, Champlin & Koehler, PA

(57) ABSTRACT

An open roof construction for a vehicle is provided, comprising a stationary roof, a roof opening provided therein, a movable panel for opening and closing said roof opening and two stationary guides positioned along opposite longitudinal edges of the roof opening for guiding two guide shoes provided close to the forward edge of the movable panel. The guides each comprise at least a vertically extending guide part for a guiding cooperation with a corresponding vertically extending guide shoe part. The guide shoes are attached to the movable panel in a substantially vertically and horizontally adjustable manner by means of substantially transversally extending adjustment screws. In a position of the movable panel fully closing the roof opening the adjustment screws are covered by the stationary guides as seen in a transverse direction. The vertically extending guide parts of the stationary guides are provided with openings for, in said position, allowing access to the adjustment screws by means of an appropriate tool.

21 Claims, 5 Drawing Sheets

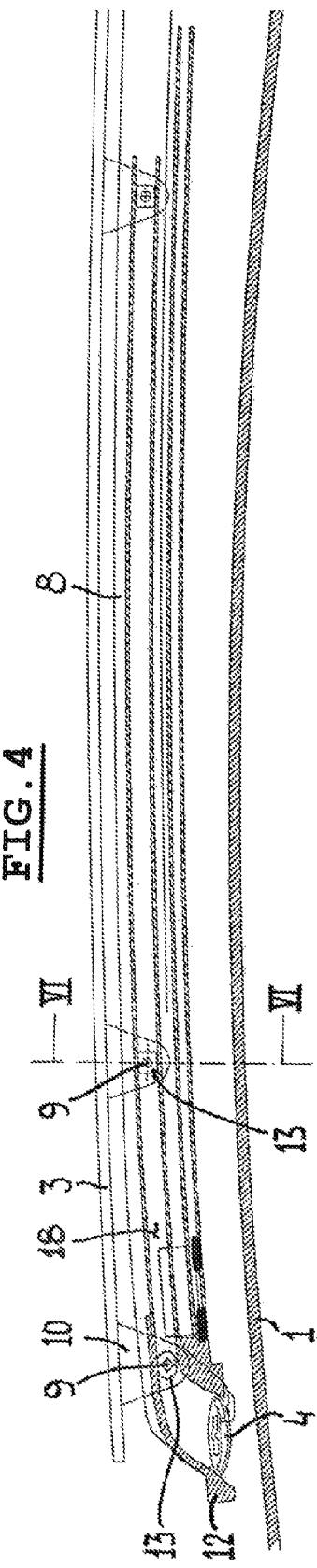

OPEN ROOF CONSTRUCTION FOR A VEHICLE

BACKGROUND

The discussion below is merely provided for general background information and is not intended to be used as an aid in determining the scope of the claimed subject matter.

Aspects of the invention relate to an open roof construction for a vehicle, comprising a stationary roof, a roof opening provided therein, a movable panel for opening and closing said roof opening and two stationary guides positioned along opposite longitudinal edges of the roof opening for guiding two guide shoes provided close to the forward edge of the movable panel, which guides each comprise at least a vertically extending guide part for a guiding cooperation with a corresponding vertically extending guide shoe part, wherein the guide shoes are attached to the movable panel in a substantially vertically and horizontally adjustable manner by means of substantially transversally extending adjustment screws.

Before discussing the state of the art it is noted that indications as 'vertically', 'horizontally' and 'transversally' in a conventional manner refer to the geometry of the vehicle (such that, for example, the transverse direction extends in a horizontal plane across the vehicle).

The adjustment screws allow positioning the movable panel correctly with respect to the stationary roof, especially in the closed position of the movable panel. In such a closed position the adjustment screws are loosened and the position of the guide shoes relative to the movable panel (and thus the position of the movable panel relative to the stationary roof) is adjusted until the movable panel is positioned in a correct manner (which may mean, for example, correctly engaging seals surrounding the roof opening). Next the adjustment screws are tightened again for fixating the obtained position of the guide shoes relative to the movable panel. As a result it is assured that during following opening and closing procedures the movable panel always will reach the correct closed position.

Because the adjustment of the position of the guide shoes is carried out in the closed position of the movable panel, the adjustment screws have to be accessible in said position. Accordingly this means that in the closed position of the movable panel the adjustment screws are located above the stationary guides, as seen in a transverse direction. This, however, results in such a distance between the guide shoes and the movable panel that in the closed position of the panel the guide shoes (and the corresponding end parts of the stationary guides, the 'locators') protrude rather far downwardly towards the passenger compartment of the vehicle, requiring, on one hand, a low position of the lower lining of the roof of the vehicle and creating, on the other hand, a substantial risk on injuries during accidents.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

Thus, in accordance with an aspect of the present invention an open roof construction of the type referred to above is provided in a position of the movable panel fully closing the roof opening with adjustment screws that are covered by the stationary guides as seen in a transverse direction and wherein the vertically extending guide parts of the stationary guides are provided with openings for, in said position, allowing access to the adjustment screws by means of an appropriate tool.

The expression 'covered by the stationary guides' means that the adjustment screws are located within the outline of the stationary guides as seen in a transverse (horizontal) direction, behind the vertically extending guide part. As a result of such a disposition the guide shoes may be positioned closer to the movable panel. In the closed position of the movable panel this leads to less protrusion of the guide shoes and the corresponding locators of the stationary guides into the passenger compartment of the vehicle while still allowing an adjustment of the movable panel.

In one embodiment the dimensions of the opening are smaller than the dimensions of the vertically extending guide shoe part. This effectively prevents the guide shoe from entering the opening with a resulting jamming of the guide shoe in the guide.

More preferably, then, said guide shoe part has a horizontal dimension and a vertical dimension wherein the opening has a horizontal dimension and a vertical dimension, wherein the horizontal dimension of the opening is smaller than the horizontal dimension of said guide shoe part and wherein the vertical dimension of the opening is equal to or smaller than the vertical dimension of said guide shoe part.

In another embodiment of the open roof construction according to the present invention the adjustment screws engage the guide shoes while extending through holes in brackets which are attached to the movable panel.

Although the adjustment screws may engage the guide shoes directly, it is also conceivable that such an engagement occurs indirectly through braces connected to and carrying the guide shoes. However, in either way the adjustment screws have a fixed position relative to the guide shoes and may be adjusted relative to the movable panel. As a result, the position of the adjustment screws relative to the openings in the stationary guides does not change during adjusting the position of the movable panel, allowing the use of rather small holes.

For allowing such an adjustment of the position of the movable panel, in one embodiment of the open roof construction according to an aspect of the present invention the holes in the brackets have an oversized shape (relative to the shafts of the screws). The shafts of the loosened adjustment screws may slide in said elongated holes in a vertical and/or horizontal direction to the desired position in which the screws are tightened and the screw heads engage the bracket. During a process of assembling the open roof construction the adjustment screws can be passed through the holes in the brackets and attached to the guide shoes (or braces connected thereto) in an open position of the movable panel. Next the panel can be moved to its closed position in which the adjustment screws are accessible through the openings in the stationary guides and will be operated (loosened and tightened) for adjusting the position of the movable panel by sliding the adjustment screws to a new position in said holes.

In another embodiment of the open roof construction according to an aspect of the present invention the holes in the brackets have an open connection to the surroundings. This feature allows a simplification of assembling the open roof construction through a reduction of steps required therefore.

The adjustment screws may be attached to the guide shoes first, after which the guide shoes are positioned in the stationary guides according to the closed position of the movable panel (thus, positioned in the locators). In this position the movable panel with its brackets is mounted to the guide shoes by sliding the open connection of the holes over the shafts of the screws until the shafts reach the holes and the movable panel reaches its correct closed position. Finally the adjustment screws are tightened.

It is possible that the movable panel for its major part is made of glass or a corresponding material. Especially in such a case the provision of the measures is advantageous because other adjustment mechanisms directly acting on the movable panel itself are not preferred because cracks or fractures could occur in the glass material.

BRIEF DESCRIPTION OF THE DRAWINGS

Hereinafter the invention will be elucidated while referring to the drawings in which:

FIG. 4 shows a longitudinal section of an open roof construction according to an aspect of the invention in a closed position;

FIG. 5 shows a longitudinal section of the same open roof construction according to an aspect of the invention in an open position;

DETAILED DESCRIPTION OF THE ILLUSTRATIVE EMBODIMENTS

Figure 1:
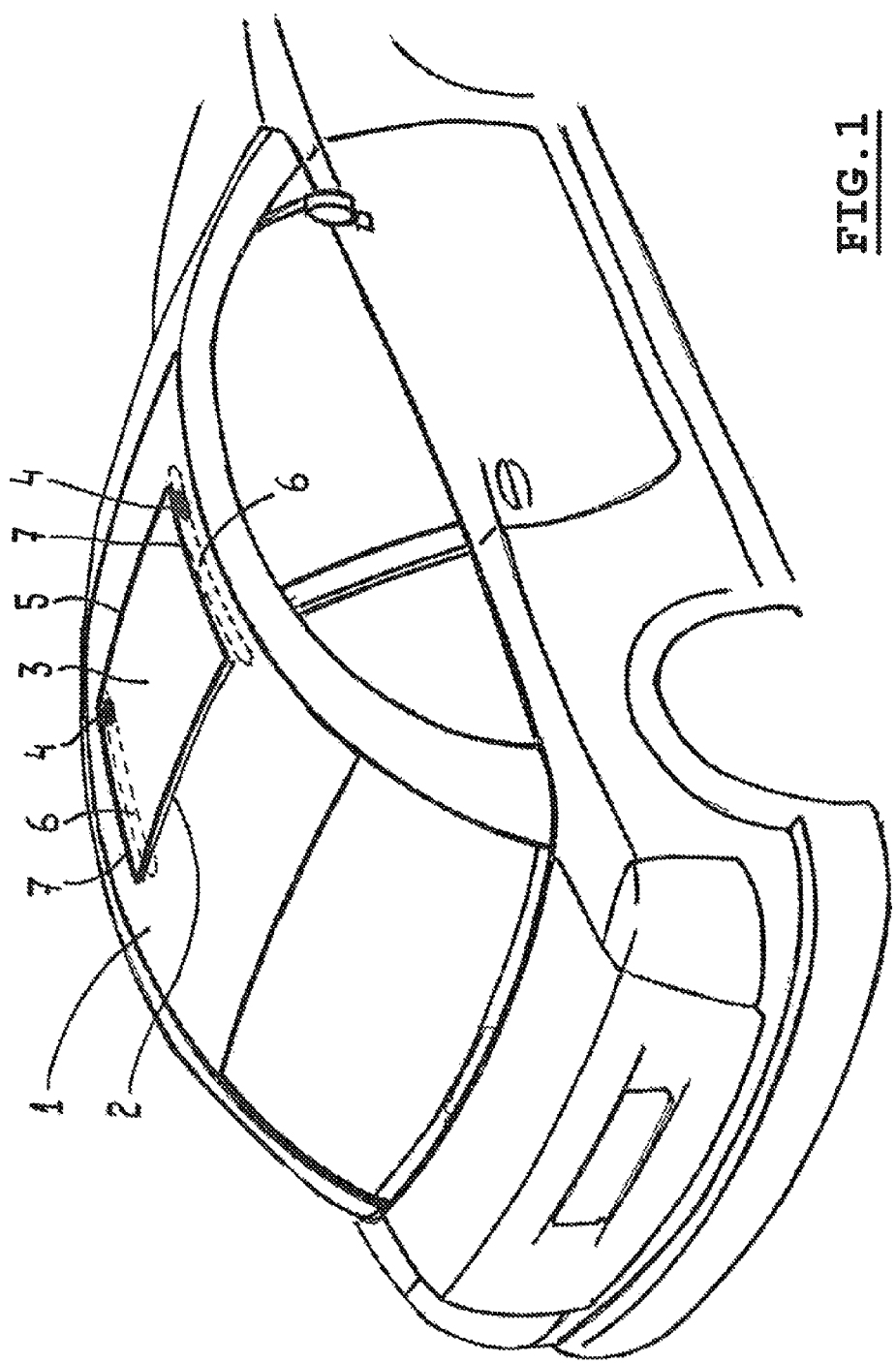
FIG. 1 schematically shows a vehicle provided with an open roof construction.

Referring to FIG. 1 a vehicle is shown comprising an open roof construction. Said open roof construction basically comprises a stationary roof 1 in which a roof opening 2 is defined. The open roof construction includes a roof assembly joined to the stationary roof 1. The roof assembly includes a movable panel 3 for opening and closing said roof opening 2. The movable panel 3 is provided having two guide shoes 4 provided close to the forward edge 5 of the movable panel. Said guide shoes 4 cooperate with two stationary guides 6 positioned along and/or formed in opposite longitudinal edges 7 of the roof opening 2.

The movable panel 3 for its major part may be made of glass or a corresponding material.

The manner in which the panel 3 is moved between its opened and closed positions and mechanisms capable therefore are well known in the state of the art and thus do not need any detailed description here. It is noted only that the cooperation between the guide shoes 4 and stationary guides 6 may occur by means of operating mechanisms causing the desired movements of the panel (e.g. lifting and sliding). Such operating mechanisms commonly include slides that are guided in the stationary guides 6 and are driven by push-pull cables connected to drive gears rotated by motors or hand cranks. Pivoting and/or sliding levers connect the movable panel 3 to the slide on each side of the movable panel and control the movement thereof. The guide shoes 4 are attached to the movable panel 3 in a substantially vertically and horizontally adjustable manner by means of substantially transversally extending adjustment screws (to be elucidated later), such that in its closed position the panel 3 may be adjusted to achieve a correct position (e.g. cooperating properly with seals—not illustrated—surrounding the roof opening 2).

Figure 2:
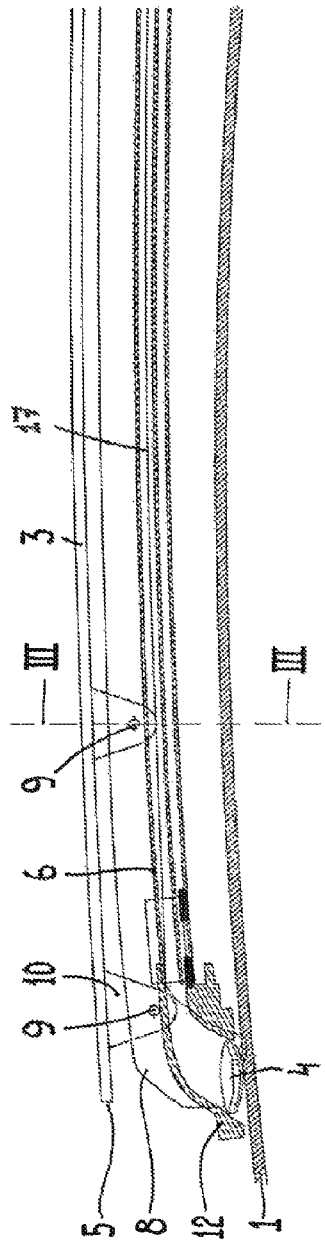
FIG. 2 shows a longitudinal section of a state of the art open roof construction.
Figure 3:
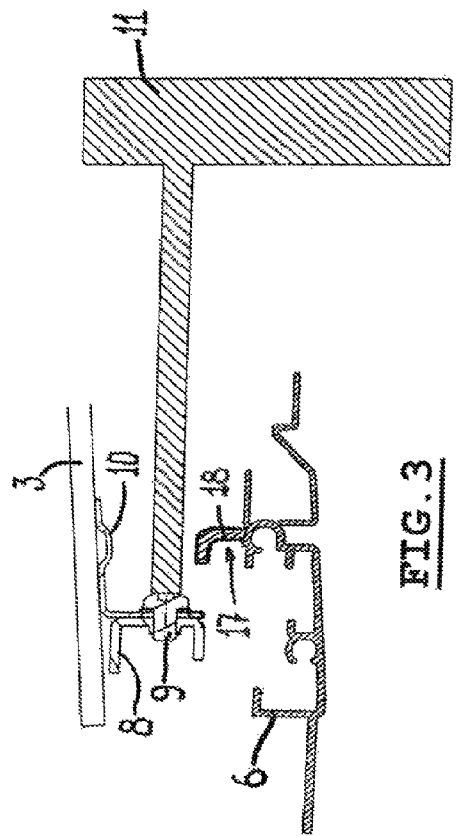
FIG. 3 shows a cross section according to III-III in FIG. 2 with applied tool.

According to the state of the art, illustrated in FIGS. 2 and 3, the guide shoes 4 are attached to braces 8 which by means of adjustment screws 9 are connected to brackets 10 which are part of the movable panel 3. The guides comprise a guide channel 17 for a guide shoe 4 with a vertically extending guide part 18 for a guiding cooperation with a corresponding vertically extending guide shoe part (visible in FIG. 2 as the frontal part of guide shoe 4). Because the adjustment screws 9 have to be operated by a tool (for example screw driver 11 in FIG. 3) in the closed position of the movable panel 3 (in which the forward guide shoes 4 are located in the most forward part of the stationary guides 6, the so-called locators 12) the adjustment screws 9 are located above the stationary guide 6 (especially the guide channel 17 thereof) in this closed position. It is also contemplated that other adjustment mechanisms besides screws can be utilized including, but not limited to, bolts and nuts, quick release fasteners such as camming members or clamping members.

Figure 6:
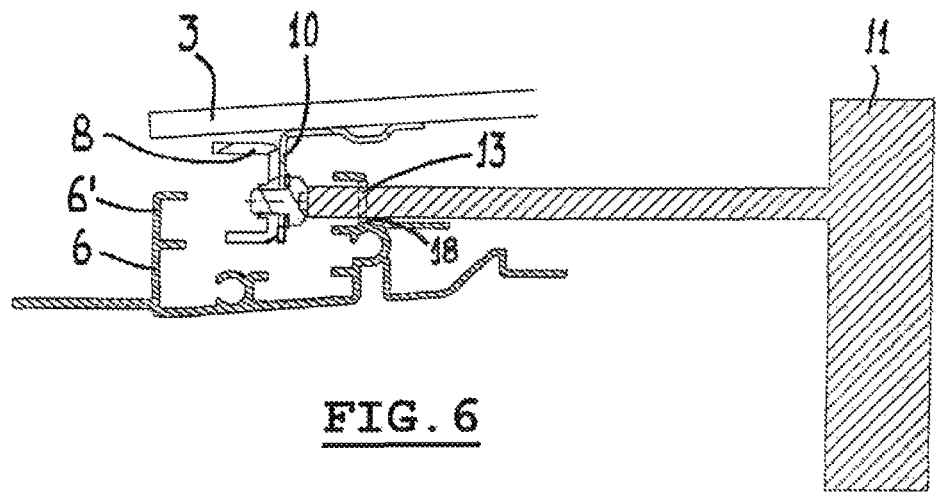
FIG. 6 shows a cross section according to VI-VI in FIG. 4 with applied tool.

According to an aspect of the present invention, however, in a position of the movable panel 3 fully closing the roof opening 2 as illustrated in FIGS. 4 and 6, the adjustment screws 9 are covered by the vertically extending part 18 of the stationary guides 6 as seen in a transverse direction and said vertically extending parts 18 of the stationary guides 6 are provided with openings 13 for allowing access to the adjustment screws 9 in said position by means of an appropriate tool 11 (FIG. 6). As a result the guide shoes 4 may be positioned closer to the panel 3. Likewise, this also applies too the guides 6 and the locators 12, such that it is possible to position the corresponding part of the stationary roof 1 (which may be a lining) at a higher level.

Figure 7:
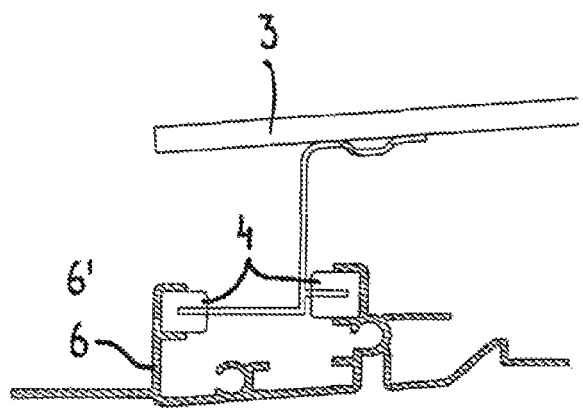
FIG. 7 shows a cross section according to VII-VII in FIG. 5.

Because the geometry of the track defined by the guides 6 does not change, the panel 3 will reach an open position (as illustrated by FIGS. 5 and 7) which is equal to the open position which will be reached by the state of the art open roof construction according to FIGS. 2 and 3, however with less height required for the mechanism between the panel 3 and the stationary roof (lining) 1. It is noted that the distance between the lining 1 and locators 12 has been exaggerated in FIGS. 4 and 5 and normally will be as small as indicated in FIG. 2.

As illustrated clearly in FIGS. 6 and 7, the stationary guides 6 are constructed from the original state of the art guides 6 as shown in FIG. 3, however with an opening 13 in vertically extending guide part 18.

Figure 8:
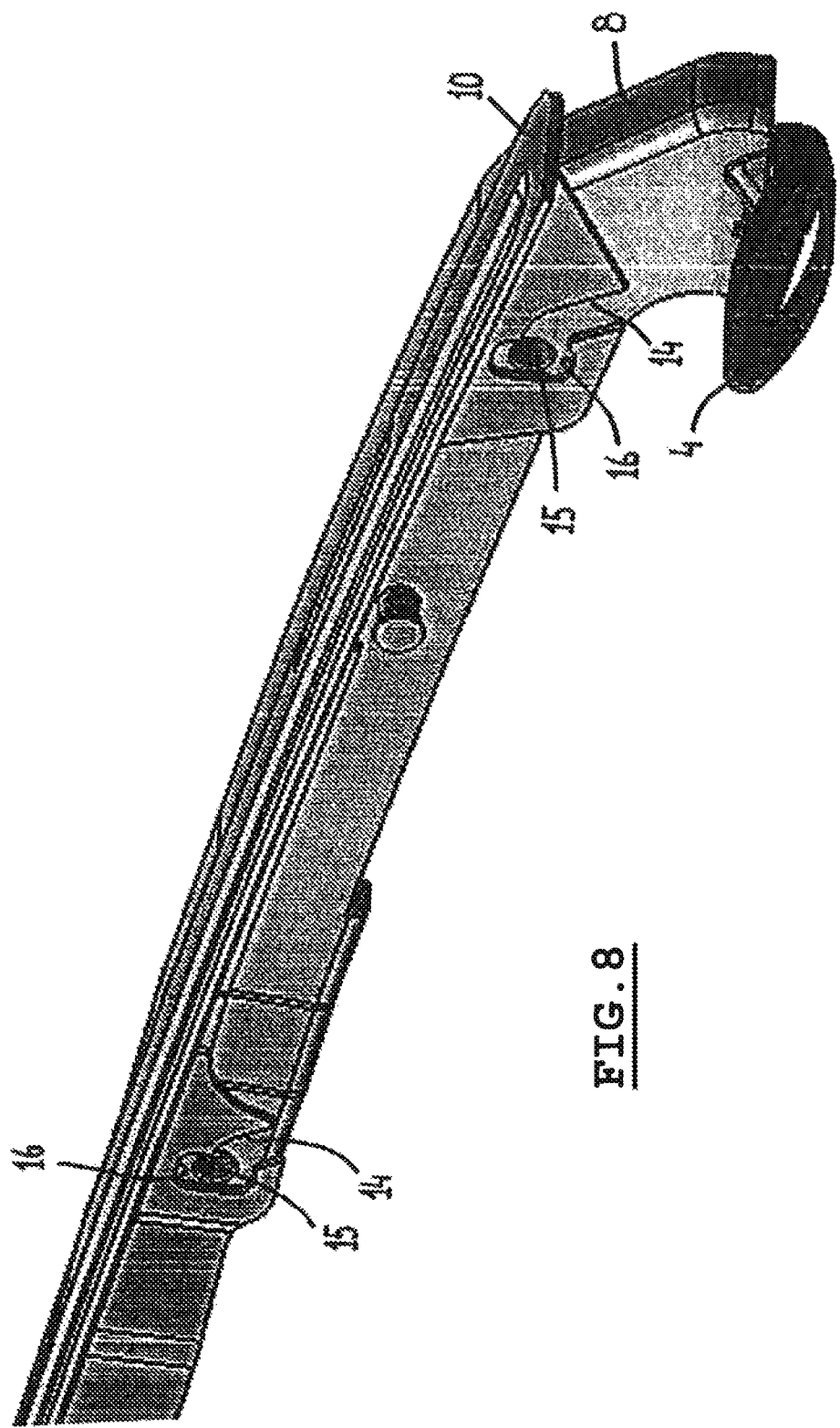
FIG. 8 shows a perspective view of part of another embodiment of an open roof construction in accordance with aspects of the present invention.

As shown in the embodiment according to FIG. 8 in which a brace 8 with attached guide shoe 4 and part of a bracket 10 (connected to the panel—not shown—) are illustrated, the bracket 10 comprises openings 16 for accommodating the adjustment screws (not illustrated) having an oversized shape with an open connection 14 to the surroundings. This feature allows a simplification of assembling the open roof construction/roof assembly through a reduction of steps required therefore. The adjustment screws 9 may be attached to the braces 8 of the guide shoes 4 first (for example in the screw holes 15 illustrated), after which the guide shoes 4 are positioned in the guides 6 according to the closed position of the movable panel 3 (thus, positioned in the locators 12). In this position the movable panel 3 with its brackets 10 is mounted to the guide shoes 4 by sliding the open connection 14 of the holes 16 over the shafts of the screws until the shafts reach the holes 16 and the movable panel 3 reaches its correct closed position. Finally the adjustment screws are tightened by passing a tool 11 through the openings 13 in the vertically extending parts of the stationary guides 6.

The dimensions of the opening 13 generally will be smaller than the dimensions of the corresponding vertically extending part of the guide shoe 4. Specifically, referring for example to FIG. 5, said part of the guide shoe 4 has a horizontal dimension and a vertical dimension and the opening 13 has a horizontal dimension and a vertical dimension. It is clearly visible that the horizontal dimension of the opening 13 is smaller than the horizontal dimension of said part of the guide shoe 4 and that the vertical dimension of the opening 13 substantially is equal to the vertical dimension of said guide shoe part.

Although the subject matter has been described in a language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

What is claimed is:

1. An open roof construction for a vehicle, comprising:
a stationary roof having a roof opening provided therein,
a movable panel for opening said roof opening in an open position and for closing said roof panel in a closed position,
two stationary guides including vertically extending guide parts positioned along opposite longitudinal edges of the roof opening,
guide shoes coupled to the movable panel to move the movable panel, each guide shoe movable along a corresponding stationary guide between a first position wherein the movable panel is in the open position and a second position wherein the movable panel is in the closed position, and
a plurality of generally transversely extending screws operably connecting the movable panel to the guide shoes on each side of the movable panel, wherein when each guide shoe is in the second position of the corresponding stationary guide, a corresponding vertically extending guide part as seen in a transverse direction of the transversely extending screw is laterally adjacent to each transversely extending screw, and wherein each vertically extending guide part is provided with a plurality of openings, each opening therethrough being aligned with an end of one of the transversely extending screws to provide access thereto through the vertically extending guide part when each guide shoe is in the second position.

2. The open roof construction according to claim 1, wherein a horizontal dimension of the openings is smaller than a horizontal dimension of the guide shoes.

3. The open roof construction according to claim 1, wherein said guide shoes have a horizontal dimension and a vertical dimension and wherein the openings have a horizontal dimension and a vertical dimension, wherein the horizontal dimension of the openings is smaller than the horizontal dimension of said guide shoes and the vertical dimension of the openings is equal to or smaller than the vertical dimension of said guide shoes.

4. The open roof construction according to claim 1, wherein the movable panel is operably connected to the guide shoes via the screws extending through holes in brackets which are attached to the movable panel.

5. The open roof construction according to claim 4, wherein the holes in the brackets are larger than shafts of the screws.

6. The open roof construction according to claim 4, wherein the holes in the brackets have an open connection to the surroundings.

7. The open roof construction according to claim 1, wherein the movable panel comprises a glass material.

8. A roof assembly for a stationary roof having an opening, the roof assembly comprising:
a movable panel configured to open said roof opening in a first position and to close said roof opening in a closed position;
two stationary guides including vertically extending guide parts positioned along opposite longitudinal edges of the movable panel, each vertically extending guide part having an opening extending therethrough; and
two guide shoes, each of the guide shoes being movable along the corresponding stationary guide between a first position wherein the movable panel is in the open position and a second position wherein the movable panel is in the closed position; and
a plurality of substantially transversally extending adjustment mechanisms, wherein each guide shoe is coupled to the movable panel in an adjustable manner with the plurality of substantially transversally extending adjustment mechanisms, and wherein when each guide shoe is in the second position of a corresponding stationary guide, a corresponding vertically extending guide part of the corresponding stationary guide is laterally adjacent the adjustment mechanisms and includes a plurality of openings, and wherein an opening is aligned with the adjustment mechanisms to allow access to the adjustment mechanism through the corresponding opening when each guide shoe is in the second position of the corresponding stationary guide.

9. The roof assembly of claim 8 and wherein the adjustment mechanisms comprise adjustment screws.

10. The roof assembly of claim 8, wherein a dimension of the openings is smaller than a dimension of the guide shoes.

11. The roof assembly of claim 8, wherein said guide shoes have a horizontal dimension and a vertical dimension and wherein the openings have a horizontal dimension and a vertical dimension, wherein the horizontal dimension of the openings is smaller than the horizontal dimension of said guide shoes and wherein the vertical dimension of the openings is equal to or smaller than the vertical dimension of said guide shoes.

12. The roof assembly of claim 9, comprising brackets connected to the movable panel wherein holes in the brackets have an open connection to the surroundings and the screws extend through the holes in the brackets to connect the guide shoes to the movable panel.

13. The open roof construction of claim 1 the screws move relative to the openings via the movement of the guide shoes along the stationary guides to move the panel to open the roof opening.

14. The open roof construction of claim 4 wherein the guide shoes are coupled to braces along the opposite longitudinal edges of the movable panel and the adjustment screws are connected to the braces to connect the movable panel to the guide shoes through the holes in the brackets.

15. The open roof construction of claim 4 wherein the holes in the brackets are sized to adjust a relative position of the brackets and the screws connecting the movable panel to the guide shoes in a horizontal or vertical direction.

16. The open roof construction of claim 8 wherein the guide shoes are coupled to the movable panel through braces along the opposite longitudinal edges of the movable panel and the adjustment mechanisms include screws connecting the braces to brackets coupled to the movable panel through holes sized to adjust a relative position of the brackets and the braces.

17. A method of mounting a movable panel in a vehicle, the movable panel configured so as to close a roof opening in a vehicle roof in a closed position, wherein stationary guides are disposed on opposite sides of the roof opening, each stationary guide having a vertically extending part with a plurality of openings, the movable panel being supported by guide shoes connected thereto with screws on opposite sides wherein a guide shoe is slidable in a corresponding stationary guide, the method comprising for each of the guide shoes:
   moving the guide shoe from a first position in the stationary guide to a second position in the stationary guide, the second position corresponding to when the movable panel is in the closed position and when a corresponding vertically extending part on each side of the movable panel is lateral of a mounting brace of the guide shoes and openings in the vertically extending part are aligned with screws used to connect the mounting brace of the guide shoes to the movable panel;
   inserting a tool through each of the openings in the vertically extending guide part on each side of the movable panel to engage the corresponding screw through the opening; and
   tightening each screw to connect the movable panel to the corresponding mounting brace.

18. The method of claim 17 wherein the movable panel includes brackets having holes with open portions configured to receive the screws, the method comprising:
   inserting each of the screws through one of the open portions and into a corresponding hole of each of the brackets with the screw attached to the mounting brace; and
   adjusting a position of the movable panel relative to the guide shoes prior to tightening the screws.

19. A method for assembling a roof assembly in a stationary roof having a roof opening, the roof assembly including a movable panel for opening and closing said roof opening and two stationary guides including vertically extending guide parts positioned along opposite longitudinal edges of the roof opening each having a plurality of openings, each stationary guide guiding a guide shoe, the method comprising:
   moving each of the guide shoes so as to position a portion of the guide shoe lateral of a vertically extending part of a stationary guide and to align each of the openings extending through the vertically extending part with a transversally extending screw;
   inserting a tool through each of the openings in the vertically extending guide parts of the stationary guides; and
   tightening the screws to operably connect the movable panel to the guide shoes.

20. The method of claim 18 and comprising:
engaging the screws in the holes of the brackets connected to the movable panel prior to moving the guide shoes to the second position.

21. The method of claim 19 and comprising:
moving the panel to adjust a position of the panel prior to tightening the screws.

\* \* \* \* \*